United States Patent [19]

Duneau

[11] Patent Number: 4,464,260
[45] Date of Patent: Aug. 7, 1984

[54] BRACELET MOUNTED SCREEN FILTER

[75] Inventor: Michel Duneau, Beaumont La Tricherie, France

[73] Assignee: UOP Inc., Des Plaines, Ill.

[21] Appl. No.: 520,266

[22] Filed: Aug. 4, 1983

[51] Int. Cl.³ .............................................. B01D 23/20
[52] U.S. Cl. ..................................... 210/232; 210/289; 210/291; 210/459; 55/496; 55/DIG. 31
[58] Field of Search ............... 210/232, 291, 289, 172, 210/220, 279, 457, 459; 55/496, 529, DIG. 31

[56] References Cited

U.S. PATENT DOCUMENTS 2,463,814 3/1949 Skinner ................................ 210/232
2,563,180 8/1951 McFarlan ............................. 210/459

FOREIGN PATENT DOCUMENTS 7364 5/1898 Norway ............................... 210/291

Primary Examiner—Ernest G. Therkorn
Assistant Examiner—John W. Czaja
Attorney, Agent, or Firm—James R. Hoatson, Jr.; Barry L. Clark; William H. Page, II

[57] ABSTRACT

Bracelet-shaped filter device molded of plastic has a frame surrounding a slotted filter portion and integral retaining portions which permit it to be held tightly in contact with the surface of a pipe. The filter portion contains a plurality of evenly spaced slots which are positioned so as to be spaced at a predetermined distance from an aperture in the pipe through which fluid may pass. The filter slots are V-shaped and of increasing width in a direction toward the center of the pipe. In a preferred embodiment, the retaining portions are integral straps which can be tightened and held by an integral fastener. In a modified structure which is suitable for small tubes, the device may include curved portions which are adapted to be spread apart and snapped over the sides of the tube. The devices are especially useful to prevent entry of the solid particles in a fluidized bed into the fluid supply conduit.

7 Claims, 6 Drawing Figures

BRACELET MOUNTED SCREEN FILTER

BACKGROUND OF THE INVENTION

The invention relates to the separation of a liquid and/or gaseous phase from a solid phase and particularly to filters for preventing the solid particles of a media bed from entering the flow apertures in a conduit which may distribute fluid to the bed or collect fluid from the bed. For example, in a certain process for treating a municipal water supply to remove color, odor and to oxidize biofouling agents, the raw water is caused to flow downwardly through a filter media bed of activated charcoal and to be collected at the bottom of the bed. To insure the most complete treatment of the water, compressed air is injected into the bed from tiny apertures in an array of pipes located at the bottom of the bed. The air serves to improve contact between the charcoal particles and water and thus reduces the residence time required. Whenever the air flow in the air injection pipes is shut off, the media particles, which are of a lesser dimension than the pipe apertures, would normally tend to enter the pipe. To prevent this, it has been common practice for the apertures to be covered with one or more layers of a metal or plastic filtering cloth applied directly over the openings. The cloth restricts the flow to a lesser or greater extent, depending upon the number of layers used. A single layer allows more flow but is quite subject to damage by being crushed and broken by the weight of the particles. Multiple layers are stronger but would increase the back pressure, would be relatively easily clogged, would increase the filtration velocity and thus possibly break down the media, and would increase corrosion and abrasion of the pipe. The aforementioned problems have resulted in the need to frequently close down the operation, remove the filter media, clean the pipes, and replace the filter cloths. Premature shutdown is very undesirable since a typical bed might be 70 m long, 35 m wide and 1 m in depth. Besides water treatment processes using activated charcoal, similar problems arise in other media bed processes and with other media such as resin, sand or alumina. For example, in a nuclear power plant condenser, evaporation of the cooling water increases the concentration of the minerals in the water. The minerals can be removed in a filter bed containing fine particles of resins.

SUMMARY OF THE INVENTION

It is among the objects of the present invention to provide a screen filter for an aperture in the side wall of a pipe or other cylindrical conduit which is adapted to be embedded in a media bed of solid particles. A further object is to provide such a screen filter which will distribute outward fluid flow from the aperture to the bed in a uniform manner, at a low velocity and with very little pressure drop. The screen can also perform as a collector. It is a still further object to provide such a screen which is strong, which will have a long service life, which can be easily installed, which can be accommodated to various pipe sizes, and which can be produced at a very low cost.

The foregoing and other objects and advantages are attained by the screen filter device of the present invention which may be integrally molded of plastic to include a frame portion, a screen portion adapted to be spaced outwardly from the pipe surface, and retaining portions for holding the frame portion to the pipe.

In a preferred embodiment, the filter screen has a molded plastic frame and screen portion which includes a plurality of closely spaced profile bar portions which define a plurality of inwardly diverging V-shaped slots which prevent plugging by particles contacting the outer screen surface. A pair of plastic retaining straps are integrally attached to the frame and include complementary locking members which are adapted to pass around a pipe and lock to each other in the fashion of a bracelet. The straps are preferably attached to the frame at a location which is spaced sufficiently far out from the pipe to which the filter screen is to be attached so that at least about 60% of the force exerted by the straps on the filter is in a radial direction.

In a modification, the screen is retained by a pair of relatively rigid curved arms which are adapted to snap around the pipe.

DETAILED DESCRIPTION OF THE DRAWINGS

Figure 1:
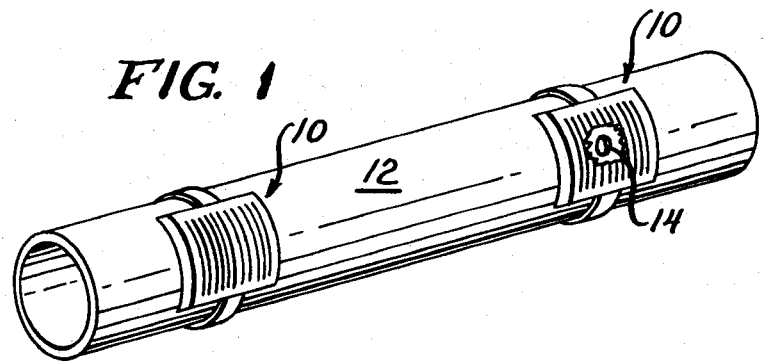
FIG. 1 is an isometric view illustrating the relationship of the bracelet filter to an apertured conduit.

FIG. 1 illustrates a typical use of a plurality of the improved bracelet type screen filter devices 10 in relation to a cylindrical conduit or pipe 12 having fluid flow apertures 14 at spaced locations along its length. In a typical installation where raw water is to be treated, the pipe elements 12 would be arranged in a large branched array at the bottom of a large tank (not shown). The pipe elements would be covered by a media bed (not shown) of a finely granulated solid material such as activated charcoal which can remove color and odors from the water and, in combination with a supply of air, can oxidize biofouling agents. The raw water would be introduced at the top of the bed and withdrawn at the bottom after a suitable residence time. Preferably, the pipe has sufficient holes 14 that the air injected through them into the media bed will gently fluidize the bed, flow through every portion of the bed and then leave the bed from its upper surface. The flow should be sufficient to insure that the raw water will be uniformly treated and that certain portions of the media bed will not contact significantly more volume of water than other portions. The velocity of air flow should be sufficiently low that the bed will not become channelized whereby it would cause water to flow through the media with too little residence time.

Figure 2:
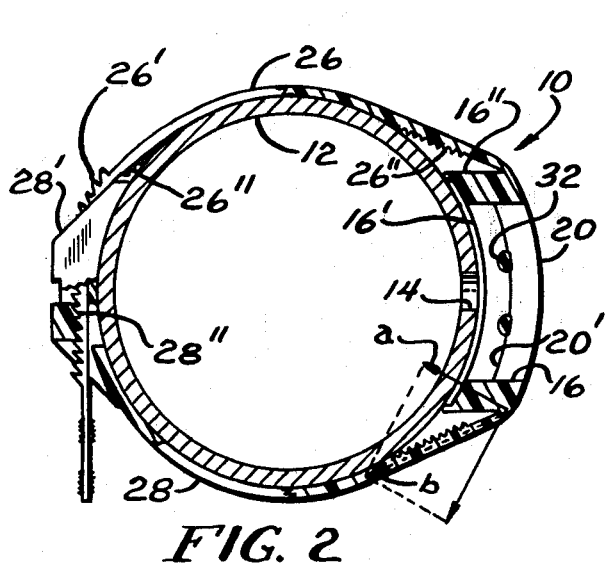
FIG. 2 is a section taken on line 2—2 of FIG. 3.
Figure 3:
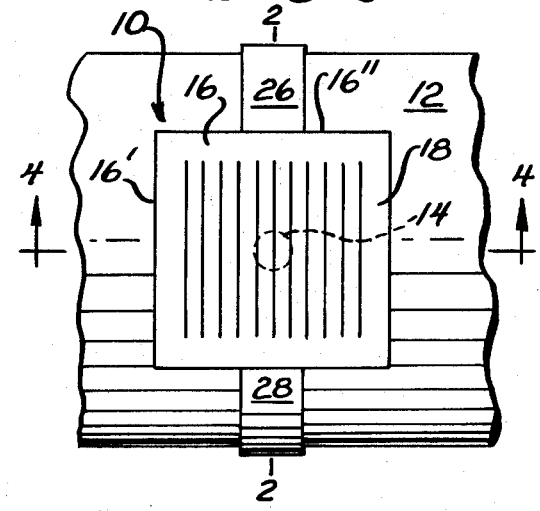
FIG. 3 is a side view of the filter and pipe shown in FIG. 2.
Figure 4:
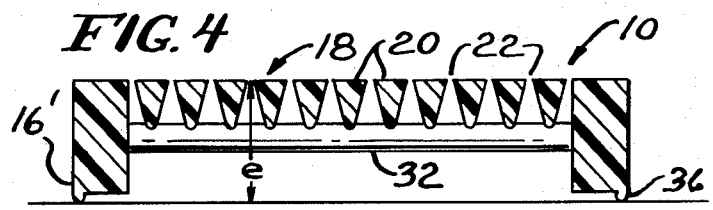
FIG. 4 is a section taken on line 4—4 of FIG. 3.

As seen in FIGS. 2–4, the filter screen device 10 is preferably molded in its entirety to include a frame portion 16, a screen portion 18 comprising wire-like surface profile portions 20 with slots 22 therebetween, and straps 26, 28 for retaining the device in position relative to the pipe 12 and the aperture 14 therein. The ends of the straps 26, 28 cooperate to lock the straps together and include complementary locking portions such as barb-like teeth 26' and a retaining portion 28' which includes detents 28" engaged by the teeth 26'.

The particular locking device used forms no part of the present invention and will not be described further. Depending on the size of the screen wire portions 20 and the load exerted on them by the media bed particles, it might be desirable to reinforce the wire portions 20 by one or more integrally molded support bars 32. Although the bars 32 are illustrated in FIGS. 2 and 3, they were not provided in a prototype used with a pipe 12 having a diameter of 32 mm, and quite satisfactory performance was achieved. Other parameters of the prototype included forming the slots 22 such that their total open area was about 100 times the area of pipe aperture 14. The particular plastic used to mold the device 10 can be any suitable plastic which will stand up to the environment in which the device will be used. For example, polypropylene, PVC or polyethylene could be used. In order that the integral straps 26, 28 can best maintain the frame portion 16 in sealed contact with the pipe 12, they are preferably attached to the frame near its outermost edges as best seen in FIG. 2. It is also preferable that the radial component of force indicated by the vector line "a" which holds the device to the pipe, be at least about 60% of the total force exerted by one of the straps as indicated by vector line "b". To prevent slippage of the device relative to the pipe, the underside of the straps 26, 28 are preferably molded with a serrated or rough surface 26" which will frictionally engage the pipe surface. The outer surface of the screen wire portions 20 should be spaced from the surface of the pipe 12 by a dimension "e" (FIG. 4) which is sufficient to permit relatively uniform flow through all the screen slots 22 with minimal pressure drop. The end and side walls 16', 16" of the frame determine the value of dimension "e" and should be of sufficient height that "e" will be equal to at least twice the height of wire portions 20. The end walls 16' are curved to fit the diameter of the pipe 12. The lower ends of the walls 16', 16" preferably have a very thin cross-section as shown at 36 so that they can deform and conform to the pipe shape when the straps 26, 28 are tightened. The deformation provides a tight seal and also cooperates with the rough surface 26" to prevent rotation or slippage. Although not generally necessary, additional retention could be provided with a layer of adhesive between the device 10 and the pipe 12.

Figure 6:
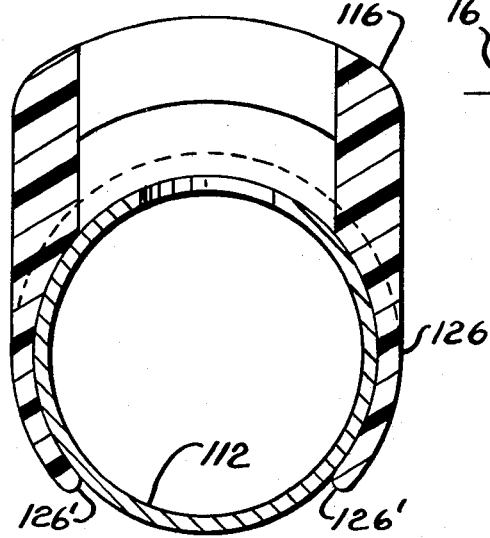
FIG. 6 is a section taken on line 6—6 of FIG. 5.
Figure 5:
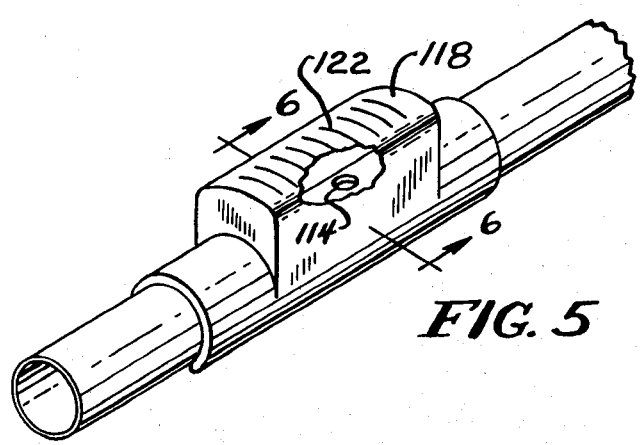
FIG. 5 is an isometric view illustrating a modified filter.

FIGS. 5 and 6 illustrate a screen filter device 110 which is a modification of the device 10 shown in FIGS. 1-4. The housing 116 has a planar screen portion 118 with slots 122 for straining particles (not shown) and preventing them from entering an aperture 114 in a pipe 112. Integral with the housing 116 are curved retaining arms 126 which are sufficiently resilient that they can diverge as the device is assembled to a pipe 112, but have sufficient stiffness to exert a tension on the frame 116 which will retain the device in tight contact with the pipe during use. As with the device of FIGS. 1-4, the arms 126 can be roughened on their inner surface to resist rotation. Furthermore, a sealing compound or adhesive could be placed between the frame 116 and pipe 112 to assist in the retention of the device and prevent its rotation. The tips 126' of the arms must of course be closer together than the diameter of the pipe 112 which they engage so they can exert a holding force on it. Furthermore, the arms must also be sufficiently long that they and the frame 116 will engage more than half the circumference of the pipe 112. To facilitate molding, it is preferable that the distance between the tips 126' be no less than the length of the slots 122.

I claim as my invention:

1. A separation device adapted to be mounted to the exterior surface of a cylindrical fluid distributing and/or collection conduit located in a bed of solid particulate media for preventing entry of the solid media into an aperture in said conduit which is covered thereby, said device including a molded plastic frame portion adapted to be held in sealed relationship to said conduit in a region immediately surrounding said aperture; a molded plastic slotted screen surface portion integral with and supported by said frame portion at a spaced radial distance from said conduit and aperture; said screen surface portion including a plurality of uniformly spaced profile wire-like portions which have a generally planar outer surface and inwardly converging side portions which define a plurality of inwardly diverging slot openings, the width of said slot openings being less than about the smallest dimension of the solid particulate media but the total area of said slot openings being substantially greater than the area of said one aperture; and a pair of integral retaining members extending from opposed sides of said frame portion, said pair of retaining members being adapted to extend around at least the major portion of the circumferential extent of the conduit and to transmit a tension force to said frame portion to hold it in tight sealed engagement with said conduit.

2. A separation device according to claim 1 wherein said integral retaining members are straps which include interlocking portions, said straps, when tightened, serving to maintain said device in sealed engagement with said conduit.

3. A separation device according to claim 2 wherein said straps extend from opposed outer edge portions of said frame portion, said edge portions being spaced at a sufficient radial distance from the surface of the conduit that the radial component of the force exerted on the frame by each strap when the straps are tightened will be at least 60% of the force exerted by said strap.

4. A separation device according to claim 2 wherein said slotted screen surface portion is spaced radially from said conduit and aperture by the side and end walls of said frame portion, said walls having a reduced cross-section at their point of contact with said conduit so as to permit them to be at least partially deformed to the shape of the conduit when said straps are tightened.

5. A separation device according to claim 4 wherein a roughened surface is formed on portions of said straps which are adapted to engage a conduit so as to permit frictional engagement between the straps and conduit.

6. A separation according to claim 1 wherein integral support rod portions join said wire-like portions to each other intermediate their ends.

7. A separation device according to claim 4 wherein said walls are of sufficient radial extent that said wire-like portions will be spaced from said conduit by a radial distance equal to at least their height.

* * * * *

UNITED STATES PATENT AND TRADEMARK OFFICE
CERTIFICATE OF CORRECTION

PATENT NO. : 4,464,260
DATED : August 7, 1984
INVENTOR(S) : MICHEL DUNEAU

It is certified that error appears in the above-identified patent and that said Letters Patent is hereby corrected as shown below:

In the Drawings

Fig. 3 please change "$\frac{2}{1}$" to --- $\overrightarrow{2}$ ---

Signed and Sealed this

Eighteenth Day of December 1984

[SEAL]

Attest:

GERALD J. MOSSINGHOFF

Attesting Officer     Commissioner of Patents and Trademarks